United States Patent [19]

Dumbaugh

[11] 4,015,705
[45] Apr. 5, 1977

[54] ADJUSTABLE DRIVE VIBRATORY DEVICE

[75] Inventor: George D. Dumbaugh, Louisville, Ky.

[73] Assignee: Vibranetics, Inc., Louisville, Ky.

[22] Filed: Jan. 23, 1974

[21] Appl. No.: 435,633

Related U.S. Application Data

[63] Continuation of Ser. No. 237,276, March 23, 1972, abandoned.

[52] U.S. Cl. .................................. 198/770; 318/230
[51] Int. Cl.² ........................................... B65G 27/32
[58] Field of Search .............. 198/220 DB, 220 DC; 318/228, 229, 230, 227

[56] References Cited

UNITED STATES PATENTS

| | | | |
|---|---|---|---|
| 1,113,289 | 10/1914 | Barnum | 318/228 X |
| 1,647,295 | 11/1927 | James | 318/230 X |
| 1,928,681 | 10/1933 | Beling | 318/230 X |
| 2,440,319 | 4/1948 | Wickerham | 318/228 X |
| 2,571,454 | 10/1951 | Jones et al. | 318/227 X |
| 2,698,542 | 1/1955 | Fisher-Luttrelle et al. | 318/230 X |
| 3,251,457 | 5/1966 | Dumbaugh | 198/220 DB |
| 3,346,795 | 10/1967 | Linke | 318/227 |

Primary Examiner—Evon C. Blunk
Assistant Examiner—Bruce H. Stoner, Jr.
Attorney, Agent, or Firm—Harry B. O'Donnell, III

[57] ABSTRACT

The present invention provides an adjustable drive vibrating device, such as a vibrating conveyor, vibrating feeder and the like. Basically, the device comprises: a container, means mounting the container such that it can vibrate as a free mass, drive means including an electric motor for vibrating the container at a prescribed frequency and stroke, and control means for selectively adjusting voltage applied to the motor and thereby selectively altering the frequency and stroke at which the container is vibrated by the drive means. However, in particular accordance with the present invention, the drive means motor comprises a three-phase A.C. squirrel cage electric motor, and the control means adjust the voltage applied to only two of the three phases of the motor, while a substantially constant voltage is maintained on the third phase of the motor.

10 Claims, 4 Drawing Figures

ADJUSTABLE DRIVE VIBRATORY DEVICE

This is a continuation of application Ser. No. 237,276, filed Mar. 23, 1972, now abandoned.

BACKGROUND OF THE INVENTION

This invention relates to vibratory devices, such as a vibrating conveyor, vibrating feeder and the like, and, more particularly, to such devices wherein it is desirable to adjust the frequency and/or the stroke of the drive means for the vibratory device.

Heretofore, various means have been provided for adjusting the frequency and/or the stroke of the drive means for such vibratory devices. Prior to the advent of my U.S. Pat. No. 3,251,457 (the basic structure and operation of which is shown in FIGS. 1 and 1A of the present drawing), most of these frequency and stroke adjusting means had been mechanical rather than electrical. The disclosure to the public of these previously patented electrical means of mine and their simplicity and greatly reduced costs when compared to the old mechanical forms has since led to their present general usage by the vibratory device industry.

However, in follow up to my development of this previously patented structure of mine, I have now found that, in accordance with the present invention, satisfactory and yet less expensive electrical means can be provided for adjusting the frequency and stroke of such vibratory devices. These latest means of mine (illustrated in FIGS. 2 and 2A of the present drawing) permit approximately yet another one-third reduction in costs over those described in my aforenoted earlier patent.

SUMMARY OF THE INVENTION

The present invention provides an adjustable drive vibrating device, such as a vibrating conveyor, vibrating feeder and the like. Basically, the device comprises: a container, means mounting the container such that it can vibrate as a free mass, drive means including an electric motor for vibrating the container at a prescribed frequency and stroke, and control means for selectively adjusting voltage applied to the motor and thereby selectively altering the frequency and stroke at which the container is vibrated by the drive means. However, in particular accordance with the present invention, the drive means motor comprises a three-phase A.C. squirrel cage electric motor, and the control means adjusts the voltage applied to only two of the three phases of the motor, while a substantially constant voltage is maintained on the third phase of the motor.

While other equivalent forms of electrical control means may be employed, the control means preferably comprises a two-phase autotransformer. And, the motor preferably has its three phases electrically "Y-connected" to one another with two of its three phase coils respectively electrically connected to two phases of a three-phase voltage source through the two phase coils of the two-phase autotransformer and with its third phase coil directly electrically connected to the third phase of the three-phase voltage source.

BRIEF DESCRIPTION OF THE DRAWING

The present invention is illustrated in the accompanying drawing, wherein.

DETAILED DESCRIPTION

Figure 1:
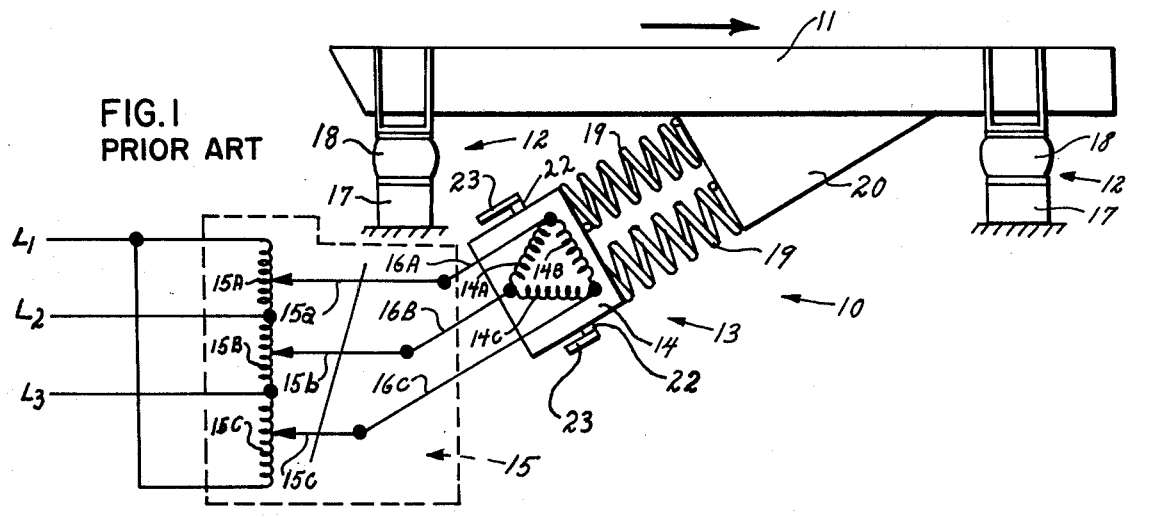
FIG. 1 is a somewhat schematic elevational view, including an electrical wiring diagram, illustrating one form of my previously patented adjustable drive vibrating device.
Figure 1A:
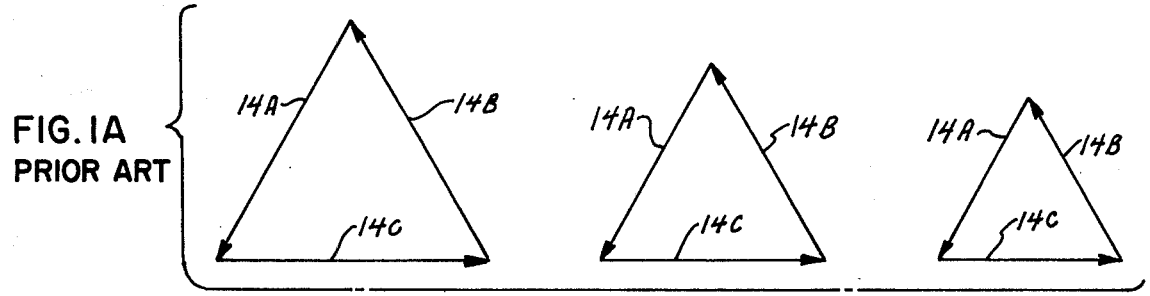
FIG. 1A includes electrical vector diagrams respectively illustrating the voltages applied to each of the three phases of the motor of the prior-art structure of FIG. 1 at high, medium and low levels as viewed from left to right on the page.
Figure 2:
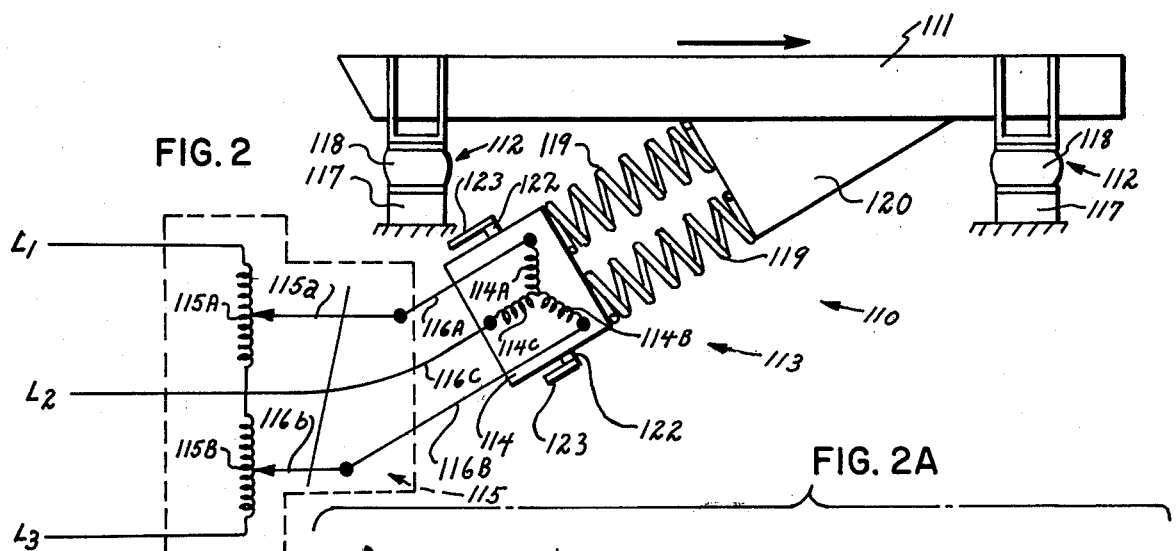
FIGS. 2 and 2A are views respectively generally similar to FIGS. 1 and 1A, but instead illustrating a presently preferred form of my present invention.
Figure 2A:
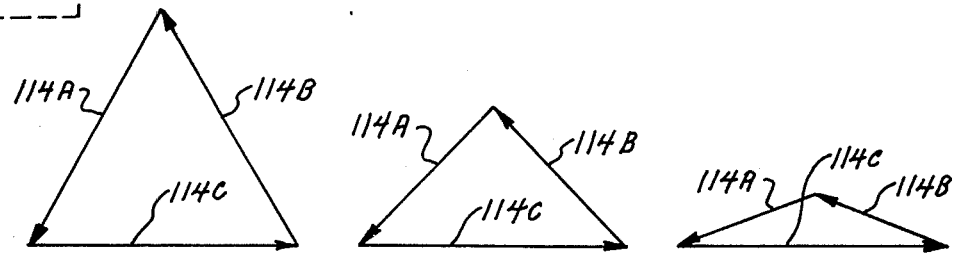

My previously patented invention, shown in FIGS. 1 and 1A, and my present invention, illustrated in FIGS. 2 and 2A, are both concerned only with that type of vibratory device in which the material container is vibrated as a free mass, i.e., wherein the container is suitably isolated from the ground so that it may be vibrated in response to an oscillating force, as distinguished from a mass which is positively connected to the exciting force, as, for example, by driving the container through an arm rigidly connected to a fixed stroke eccentric drive.

Turning now to the drawing, it can be seen that the basic structure of my previously patented device 10 (FIG. 1) and the device 110 of my present invention (FIG. 2) are somewhat similar. Both devices 10 and 110 include a container 11 or 111, mounting means 12 or 112 mounting the container 11 or 111 such that the container 11 or 111 can vibrate as a free mass, drive means 13 or 113 including a three-phase A.C. squirrel cage electric motor 14 or 114 for vibrating the container 11 or 111 at a prescribed frequency and stroke, and control means 15 or 115 for selectively adjusting voltage applied to the motor 14 or 114 and thereby selectively altering the frequency and stroke at which the container 11 or 111 is vibrated by the drive means 13 or 113. The major difference between my previously patented device 10 and my present device 110 lies in the difference in the construction of the two control means 15 and 115.

The illustrated container 11 or 111 comprises a trough that is defined by a bottom wall, side walls and one end wall, with the forward or right end of the trough as illustrated being open. It is over this open end of the container 11 or 111 that bulk particulate material, such as sand, gravel and the like, is delivered to a desired point at some selected rate of speed. This bulk of material is usually placed in the container 11 or 111 from an overhead discharge bin or an overhead conveyor, or some other similar means (not shown). The vibratory container 11 or 111 is mounted on stanchions 17 or 117 which may be suspended from overhead or bolted to the ground or floor. Interposed between the stanchions 17 or 117 and the container 11 or 111 are isolators 18 or 118 which may be any suitable type of spring suspension, but in this case are illustrated as pneumatic bags. These isolators 18 or 118 permit the container 11 or 111, with the load which it carries, to vibrate as a free mass, as distinguished from a vibratory mass driven in oscillatory fashion by a fixed stroke eccentric drive that is positively connected to a container.

Mounted beneath the container 11 or 111 is the drive means 13 or 113 for vibrating the container 11 or 111 at a selected frequency and stroke for moving the particulate material contained with the container toward the container open end. The rate of feed can be controlled by alternating the frequency and stroke at which the container 11 or 111 is vibrated by the drive means 13 or 113. The motor 14 or 114 of the drive means 13 or 113 comprises a single A.C. (alternating current) three-phase squirrel cage induction motor which is connected by two helical springs 19 or 119 to a motor mount bracket 20 or 120 that is rigidly secured to the bottom of the container 11 or 111. For convenience, the type of the A.C. motor 14 or 114 will, hereinafter, be referred to simply as a three-phase A.C. squirrel cage electric motor, as is to be distinguished from a variable speed A.C. electric motor having multiple windings or multiple poles for speed control.

At the opposite ends of the rotary output shaft 22 or 122 of the motor 14 or 114 a weight 23 or 123 is eccentrically mounted. Usually these weights 23 or 123 are fixed to the shaft 22 or 122 in a parallel relationship, although in some instances it may be desirable to vary their angular relative positions to achieve adjustment of the effective eccentric mass operating on the vibratory system, or adjusting weights may be added to or subtracted from the eccentric weights 23 or 123 as required. While not illustrated, shrouds cover the ends of the motor shaft 22 or 122 to protect operating personnel from the revolving eccentric weights.

The motor 14 or 114 is supported in such a manner that the exciting oscillatory force supplied by the eccentric weights 23 or 123 is applied to the container 11 or 111 along a fixed angle of attack. This angle of attack is ordinarily on the order of from 20° to 40°, and it will be seen that as an oscillating force is applied to the container 11 or 111 along its long axis, the particulate on the container 11 or 111 is caused to move toward the container open end by what might be termed a "hopping" action. Obviously, as the frequency of the oscillating force is reduced and/or as the stroke is reduced, the rate of feed is correspondingly reduced and it is desirable to have this rate of feed variable between zero, or substantially zero, and the maximum rate of feed.

The springs 19 or 119 are preferably selected with K Factors, that is, spring rates, which are appropriately related to the frequency of the motor drive, the mass of the motor drive component, and the total mass of the driven vibratory system, so that under normal synchronous speed of the drive motor, the springs 19 or 119 will be at or near natural frequency with the system. In other words, for ideal operation, the vibratory system with its exciter drive is designed to operate at as close to the natural frequency of the system as in the manner well known to the art.

Prior to the advent of my aforenoted U.S. Pat. No. 3,251,457, it had been customary to vary feed rate by altering in some manner the spring rate of the springs 19 or 119 or, more precisely, to use a type of spring between the motor 14 or 114 and the container 11 or 111 which is capable of having its spring rate varied in some appropriate manner. Typical of this approach is the Musschoot U.S. Pat. No. 2,984,339. This had been true even though A.C. squirrel cage motors had been used in such arrangements for providing the exciting force.

In my previously patented invention, I found a most surprising and unique relationship between the characteristics of the vibratory system and the driving motor, whereby it is possible, in a manner which would never have been suspected, to vary not only the frequency, but also to simultaneously vary the stroke of a natural frequency vibrating feeder or similar vibratory system merely by changing the voltage on the A.C. motor. An A.C. squirrel cage motor had always been thought of as essentially a constant speed motor (except, of course, a multi-speed or multi-winding A.C. motor)—one which could not have its speed effectively varied by voltage control. I found, however, that the variable load requirements of a free mass, natural frequency, vibratory system in relation to speed are similar to those of a fan or a fluid pump and that it was possible to use variations in the voltage applied to the A.C. squirrel cage motor as an effective means for controlling the feeding rate of this type of vibratory system, and that, surprisingly, this could be accomplished without motor overload.

This ability to control feed rate merely by voltage control, of course, lent itself to the remote control of systems of this type and was far more convenient than attempting to adjust or vary the rate of the force-transmitting spring units interposed between the motor and the container.

As shown in FIGS. 1 and 1A, the control means 15 of my previously patented device comprises a three-phase autotransformer which includes three phase coils 15A, 15B, and 15C and three adjustable members 15a, 15b, and 15c that are mechanically interconnected in a well-known manner to permit simultaneous selective adjustment of them. In this old arrangement of mine, the three-phase autotransformer 15 has its three phase coils 15A, 15B, and 15C electrically connected to a source of three-phase electric power, including power supply lines $L_1$, $L_2$, and $L_3$, while its three adjustable elements 15a, 15b, and 15c are electrically connected to the motor 14 which, in turn, has its three phase coils 14A, 14B, and 14C electrically "delta-connected" to one another. With this prior-art system of mine, the three autotransformer phase coils 15A, 15B, and 15C are connected to one another in electrical series, with one of them 15A being electrically connected across a first pair of the three-phase power source lines $L_1$ and $L_2$, a second of them 15B being electrically connected across another pair of the power lines $L_2$ and $L_3$, and the third of them 15C being electrically connected across yet another pair of power lines $L_1$ and $L_3$. And, in this old arrangement of mine, each of the three adjustable elements 15a, 15b, and 15c of the autotransformer 15 is respectively electrically connected to a point located between any two of the three delta-connected phase coils 14A, 14B, and 14C of the motor 14, with one adjustable element 15a being so interconnected by a conductor 16A between the motor phase coils 14A and 14B, another adjustable element 15b being so interconnected by a conductor 16B between the motor phase coils 14A and 14C, and the third such adjustable element 15c being interconnected by a conductor 16C between the motor phase coils 14B and 14C.

As shown by the electrical voltage vector diagrams in FIG. 1A, simultaneous adjustment of the adjustable elements 15a—c of the control means 15 of my prior-art device 10 will cause the levels of the voltage supplied from the power source lines $L_1$, $L_2$, and $L_3$ to be simultaneously raised or lowered by an equal amount in each of the three phase coils 14A–C of the motor 14. As illustrated, each of these three voltage vector diagrams of my previously patented invention (FIG. 1A), whether the voltage levels be high, medium or low, forms an equilateral (and, hence, equiangular) triangle.

In accordance with the present invention, I have found that satisfactory results can be obtained and costs reduced by approximately 1/3 over my previously patented device (FIGS. 1 and 1A) by employing my new device 110, shown in FIGS. 2 and 2A, wherein I utilize novel control means 115. While other equivalent electrical means having minimal impedance that remains essentially constant may be substituted without departing from the spirit and scope of my present invention, my new control means 115 preferably comprises a two-phase autotransformer, which includes two phase coils 115A and 115B and two adjustable members 115a and 115b that are mechanically interconnected in a well-known manner to permit simultaneous selective adjustment of them.

As shown in FIG. 2, the two-phase autotransformer 115 has its two phase coils 115A and 115B connected in electrical series with one another, and these two phase coils 115A and 115B are electrically connected across only two lines $L_1$ and $L_3$ of the three-phase power source lines $L_1$, $L_2$, and $L_3$, while its two adjustable elements 115a and 115b are electrically connected to the motor 114 which, in turn, has its three phase coils 114A, 114B, and 114C electrically Y-connected to one another. And, in this new system of mine (FIGS. 2 and 2A) one of the two adjustable elements 115a of the two-phase autotransformer 115 is electrically connected by a conductor 116A to one end of one of the three Y-connected phase coils 114A of the motor 114, while the other adjustable element 115b is connected by a conductor 116B to one end of another one of the Y-connected phase coils 114B of the motor 114, and a third conductor 116C directly connects one end of the third one 114C of the Y-connected phase coils of the motor 114 to the third one $L_2$ of the three-phase power source lines.

As shown in FIG. 2A, simultaneous adjustment of the two adjustable elements 115a and 115b of the control means 115 of my new device 110 will cause the levels of voltage supplied from two lines $L_1$ and $L_3$ of the three-phase power source to be simultaneously raised or lowered by an equal amount in only two of the phase coils 114A and 114B of the motor 114, operating in its "running speed" condition through a range of voltage values including a plurality of different partial values of the full voltage available while substantially constant voltage will be maintained on the third phase coil 114C of the motor 114.

As further shown in FIG. 2A, adjustment of the control means 115 to provide reduced voltages (and consequently reduced stroke and frequency operation by the drive means 113) will produce triangles (e.g., the illustrated medium and low) which are isoceles rather than equilateral triangles. The voltage which is directly supplied from the power source line $L_2$ to one of the three phase coils 114C of the motor 114 will be maintained at a substantially constant level, while the voltage that is applied across the other two phase coils 114A and 114B of the motor 114 from the other two power source lines $L_1$ and $L_3$ will be selectively simultaneously adjusted upwardly or downwardly through adjustment of the two adjustable members 115a and 115b of the control means 115.

This new invention of mine offers the advantage of reducing the cost of the control means. More specifically, instead of requiring a three-phase control, such as the three coil, three-phase autotransformer 15 as in my old device 10 (FIG. 1), my present device 110 requires only a two-phase control, such as the two coil, two-phase autotransformer 115 (FIG. 2), which essentially reduces the cost of the required control means by ⅓.

And, as still further shown in FIG. 2A, the isoceles triangular configuration of the reduced voltage vector diagrams of the motor 114 of my present invention indicates that adjustment of the voltages applied by the two-phase control means 115 will cause concurrent adjustment of the angular relationships between the voltages present in each of the three phase coils 114A, 114B, and 114C of the motor 114. This, in turn, causes the motor 114 to develop negative torque braking as voltage is reduced by adjustment of the control means 115. And, conversely, such braking torque will be released as voltage is increased by adjustment of the control means 115.

It should be apparent that while there has been described what is presently considered to be a presently preferred embodiment of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of the present invention.

What is claimed is:

1. An adjustable drive vibrating device comprising:
    a. a container,
    b. means mounting said container such that said container can vibrate as a free mass,
    c. drive means including a three-phase A.C. squirrel cage electric motor for vibrating said container at a prescribed frequency and stroke, and
    d. control means having minimal impedance that remains essentially constant for selectively adjusting the voltage applied to two of the three phases of said motor during its "running speed" condition of operation through a range of voltage values including a plurality of different partial values of the full voltage available while a substantially constant voltage is maintained on its third phase and thereby selectively altering the frequency and stroke at which said container is vibrated by said drive means such that said motor developes negative braking torque as voltage is reduced by adjustment of said control means and, conversely, said braking torque will be released as voltage is increased by adjustment of said control means.

2. The invention of claim 1, wherein said control means comprises a two-phase autotransformer.

3. The invention of claim 2, wherein said motor has its three phase coils electrically Y-connected to one another.

4. The invention of claim 3, wherein:
    a. said motor has two of its three phase coils respectively electrically connected to two phases of a three-phase voltage source through the two phase coils of said two-phase autotransformer, and
    b. said motor has its third phase coil directly electrically connected to the third phase of said three-phase voltage source.

5. An electric motor drive for a vibratory free mass system comprising:
    a. a mass mounted for free vibratory movement,
    b. drive means, including a three-phase A.C. squirrel cage electric motor carrying an eccentric weight, for exciting said mass to vibratory movement with a given frequency and stroke, and c. control means having minimal impedance that remains essentially constant for selectively simultaneously adjusting the voltage applied across two of the three phases of said motor during its "running speed" condition of operation through a range of voltage values including a plurality of different partial values of the full voltage available while a substantially constant voltage is maintained on its third phase and thereby selectively simultaneously altering said stroke and frequency such that said motor developes negative braking torque as voltage is reduced by adjustment of said control means and, conversely, said braking torque will be released as voltage is increased by adjustment of said control means.

6. The invention of claim 5, wherein said control means comprises a two-phase autotransformer.

7. The invention of claim 6, wherein said motor has its three phase coils electrically Y-connected to one another.

8. The invention of claim 7, wherein:
a. said motor has two of its three phase coils respectively electrically connected to two phases of a three-phase voltage source through the two phase coils of said two-phase autotransformer, and
b. said motor has its third phase coil directly electrically connected to the third phase of said three-phase voltage source.

9. The invention of claim 8, further including spring means interposed between said mass and said motor.

10. The invention of claim 5, further including spring means interposed between said mass and said motor.

* * * * *